UNITED STATES PATENT OFFICE.

JOHN W. DAVIES, OF BOSTON, MASSACHUSETTS.

METHOD OF PRESERVING MILK.

1,197,270.

Specification of Letters Patent.

Patented Sept. 5, 1916.

No Drawing.

Application filed January 24, 1916. Serial No. 73,784.

*To all whom it may concern:*

Be it known that I, JOHN W. DAVIES, a citizen of the United States, residing at Boston, in the county of Suffolk and State of Massachusetts, have invented an Improvement in Methods of Preserving Milk, of which the following is a specification.

The invention to be hereinafter described relates to the process or method of preserving milk and cream and its purpose is to keep such liquids in a sweet and palatable condition for an indefinite length of time, ready for use.

Heretofore, attempts have been made to preserve milk by subjecting it to a treatment, the preservative basis of which has been refrigeration. In these prior attempts, the milk has been first pasteurized by subjecting it to a temperature sufficiently high to destroy most of the bacteria and then immediately cooled to a temperature sufficiently low to prevent the development of bacteria life. Where the milk is to be preserved for any length of time, the temperature must be still further lowered, which causes the milk to solidify or freeze, and in practice the refrigerating temperature has been approximately 10° F. So long as the refrigerating temperature has been maintained, the milk has remained in the solid state and been well preserved for indefinite periods. Before such milk can be used, however, its temperature must be raised and the solid mass liquefied. This has caused a separation of the milk constituents.

In some attempts, the milk has been pasteurized and then or within a very short time after pasteurization, it has been placed in bottles and cooled to a temperature of substantially 40° F. At this temperature, however, bacteria development takes place, although more slowly than at temperatures somewhat higher, so that the length of time the milk can be preserved by this method is limited to a few days, during which the bacteria multiply and finally, at the end of three or four days, render the milk unfit for use.

Applicant has discovered that if milk be subjected to a temperature sufficiently high to destroy bacteria or germ life and be permanently maintained at substantially such temperature or a temperature sufficiently high to prevent bacteria development, it may be preserved for months in a stable, pure, and wholesome condition, ready for use.

The first step in the present process consists in pasteurizing the milk. This is best accomplished at a temperature of between 140° and 152° F. which serves to slowly destroy bacteria or germ life without "cooking" the milk, or coagulating the albumin, and may be continued until most of the bacteria have been rendered harmless. This step in the process may be carried out by any of the usual pasteurizing apparatus or it may be performed by hand. After it has been pasteurized, it is subjected to the permanent preservative temperature treatment which should be sufficiently high to prevent the development of bacteria. The preservative temperature treatment is conveniently carried into effect by transferring the pasteurized milk to a hot room, either directly in bulk or by placing the pasteurized milk in suitable containers for transfer to the hot room. Experiments have shown that the best results are secured by a minimum preservative temperature of not lower than 140° F. and a maximum of not over approximately 152° F.

Contrary to the generally-accepted theory that milk preservation for any material length of time must depend upon maintenance of a low or refrigerating temperature, such as hereinbefore noted, I have discovered, and my experiments have demonstrated, that if fresh milk be pasteurized and its temperature thereafter be permanently maintained sufficiently high to prevent bacteria development, the milk may be indefinitely preserved in stable condition, and without disintegration of the constituents as happens when milk is frozen and then liquefied.

A temperature of about 145° F. is suggested as a good pasteurizing and mean preservative temperature, but it is to be understood that such temperature may vary within a range of temperatures that will insure proper pasteurization and permanent preservation thereafter, as I believe I am the first in the art to preserve milk in stable condition for long periods of time by permanently and continuously subjecting it to a high temperature, as contradistinguished from a low or refrigerating temperature.

The term "milk" is hereby employed in its general sense and of course includes milk constituents, such as cream; and likewise the term "pasteurizing" is used in its general sense, to indicate a temperature treatment sufficiently high to destroy bacteria life.

What is claimed is:—

1. The process of preserving milk in stable condition for long periods of time, which consists in pasteurizing the milk and then subjecting the pasteurized milk to a permanent preserving temperature sufficiently high to prevent bacteria development.

2. The process of preserving milk, which consists in pasteurizing the milk, transferring the milk to containers while still maintaining the pasteurizing temperature, and subjecting the milk to a permanent preservative temperature sufficiently high to prevent bacteria development, and hold the milk in stable condition for long periods of time.

3. The process of preserving milk, which consists in pasteurizing the milk, then transferring the milk to a hot room in which the temperature is maintained sufficiently high to prevent bacteria development, whereby the milk may be permanently preserved in stable condition.

4. The process of preserving milk, which consists in pasteurizing the milk at a temperature sufficiently high to destroy bacteria or germ life without changing the condition of the milk constituents, placing the milk in containers while at substantially the same temperature, and transferring the milk to a hot room in which the temperature is maintained between substantially 140° F. and 152° F., whereby the milk may be maintained in stable condition for use for long periods of time.

5. The process of preserving milk, which consists in subjecting the milk to a pasteurizing treatment at a temperature of between 140° F. and 152° F., and then transferring the pasteurized milk to a hot room having a temperature of between 140° F and 152° F. to permanently preserve the milk in stable condition.

In testimony whereof, I have signed my name to this specification, in the presence of two subscribing witnesses.

JOHN W. DAVIES.

Witnesses:
BEATRICE I. SMITH,
PETER C. HAINS, Jr.